United States Patent [19]

Walden

[11] Patent Number: 5,722,172
[45] Date of Patent: Mar. 3, 1998

[54] CUTTING ATTACHMENT FOR ROTARY CUTTING APPARATUS

[75] Inventor: Jack G. Walden, Wheatland, Okla.

[73] Assignee: Lebever Co., Oklahoma City, Okla.

[21] Appl. No.: 598,755

[22] Filed: Feb. 8, 1996

[51] Int. Cl.$^6$ .................................................. A01D 55/00
[52] U.S. Cl. .................................. 30/347; 30/276; 56/255; 56/295
[58] Field of Search ................. 30/276, 347; 56/12.7, 56/238, 255–256, 295; 172/13–15, 17

[56] References Cited

U.S. PATENT DOCUMENTS

| | | | |
|---|---|---|---|
| D. 280,903 | 10/1985 | Barbula | D15/16 |
| 3,662,529 | 5/1972 | Glunk et al. | 56/295 |
| 4,148,141 | 4/1979 | Hoff | 30/276 |
| 4,631,828 | 12/1986 | Burnett | 30/276 |
| 4,856,194 | 8/1989 | Lee | 30/276 |
| 5,430,943 | 7/1995 | Lee | 30/347 |
| 5,617,636 | 4/1997 | Taggett et al. | 30/276 |

*Primary Examiner*—Douglas D. Watts
*Attorney, Agent, or Firm*—Dunlap & Codding, P.C.

[57] ABSTRACT

A cutting attachment is provided having a first body member, a second body member and a plurality of pins spaced an equi-distance apart for connecting the first body member to the second body member to form a rigid body wherein at least a portion of the first and second body members are spatially disposed a distance apart, each of the pins having a bearing surface substantially corresponding in length to the distance between the first and second body members. The cutting attachment further includes a connector for connecting the rigid body to a shaft or arbor of a rotating cutting apparatus and a plurality of cutting members connected to the pins such that the cutting members are rotatable about the pins and axially movable along the bearing surface of the pins to effect cooling of the bearing surface of the pins and thereby enhance the life of the cutting members by reducing heat and friction between the pins and the cutting members due to movement of the cutting members about and along the bearing surface of the pins.

10 Claims, 4 Drawing Sheets

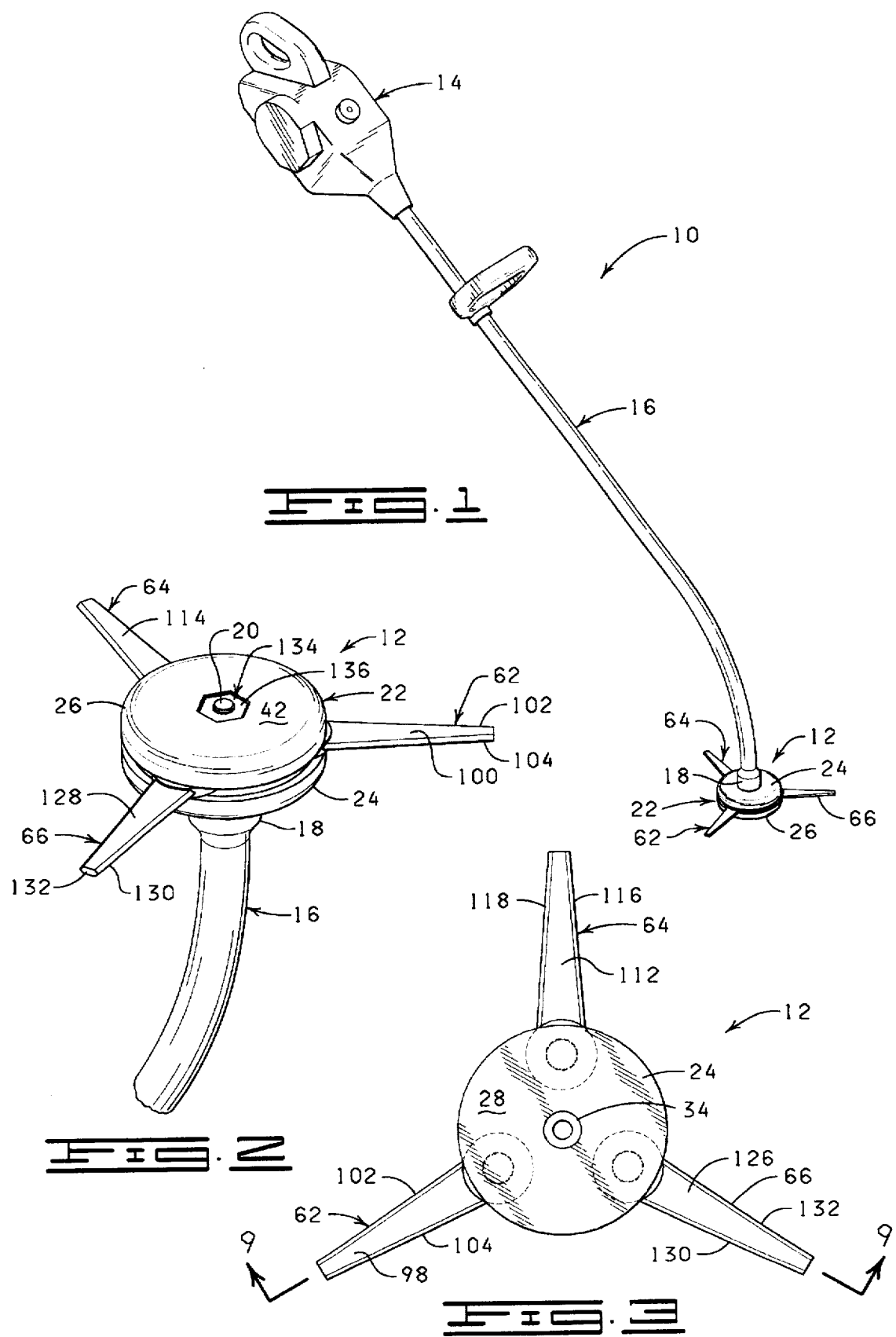

5,722,172

CUTTING ATTACHMENT FOR ROTARY CUTTING APPARATUS

BACKGROUND OF THE INVENTION

1. Field of the Invention

The present invention relates generally to rotary cutting apparatus and more particularly, but not by way of limitation, to cutting attachments for rotary cutting apparatus.

2. Brief Description of the Prior Art

The prior art is replete with various types of rotary cutting apparatus and cutting attachments for such rotary cutting apparatus. However, the prior art cutting attachments for such rotary cutting apparatus have a number of disadvantages. For example, many of the cutting attachments have inadequate skid plates or have cutting blades which wear out quickly and which are ineffective in cutting various types of vegetation, including grasses, weeds and other materials. In addition, many of the cutting attachments are not self-cleaning and collect debris during operation which adversely affects the efficiency of the rotary cutting apparatus.

Other cutting attachments which are formed with skid plates and/or are configured to be self-cleaning are expensive to manufacture, difficult to attach to various types of rotary cutting apparatus, or require special hand tools to attach and remove the cutting attachment from the rotary cutting apparatus. Further, the prior art cutting attachments are generally not interchangeable between rotary cutting apparatus made by various manufacturers.

Therefore, a need exists for an improved cutting attachment for rotary cutting apparatus which overcomes the afore-mentioned problems of the prior art cutting attachments, and which enables one to attach such cutting attachment to various rotary cutting apparatus without the requirement of hand tools or modification of the rotary cutting apparatus. It is to such a cutting attachment that the present invention is directed.

SUMMARY OF THE INVENTION

According to the present invention, a cutting attachment for a rotary cutting apparatus is provided which can be easily and quickly attached and removed from a variety of commercially available rotary cutting apparatus without the use of tools or modification of such rotary cutting apparatus. Broadly, the cutting attachment is provided with a first body member, a second body member and a plurality of pins spaced an equi-distance apart for connecting the first body member to the second body member to form a rigid body wherein at least a portion of the first and second body members are spatially disposed a distance (x) apart, each of the pins having a bearing surface substantially corresponding in length to the distance (x) between the first and second body members. The cutting attachment further includes a connector for connecting the rigid body to a shaft or arbor of the rotating cutting apparatus and a plurality of cutting members connected to the pins such that the cutting members are rotatable about the pins and axially movable along the bearing surface of the pins to effect cooling of the bearing surface of the pins and thereby enhance the life of the cutting members by reducing heat and friction between the pins and the cutting members due to movement of the cutting members about and along the bearing surface of the pins.

Each of the cutting members is characterized as having a blade portion and a head portion through which an aperture extends and through which one of the pins extends for connecting the cutting members to the pins and thus to the first and second body members of the rigid body. Each of the pins is characterized as having a first end, a medial portion which defines the bearing surface, and a second end. The pins have a pin length (pl) and a diameter (pd) such that, upon disposing one of the pins through the aperture in the head portion of one of the cutting members and connecting the first end of the pins to the first body member and the second end of the pins to the second body member, the cutting members are spatially disposed in the space or distance (x) between the first and second body members such that the bearing surface of each of the pins is exposed in such distance (x).

The blade portion of each of the cutting members has a thickness (tb) and the head portion of each of the cutting members has a thickness (th), each of which is less than the distance (x) between the first and second body members; and the apertures in the head portions of the cutting members have a diameter (ad) greater than the diameter (pd) of the pins so that the cutting members are permitted to rotate about and axially move along the bearing surface of the pins during operation of the rotary cutting apparatus and thereby effect cooling of the bearing surface of the pins and thus substantially reduce enlargement of the apertures in the head portions of the cutting members.

An object of the present invention is to provide an improved cutting attachment for a rotating cutting apparatus.

Another object of the present invention, while achieving the before-stated object, is to provide a cutting attachment which can be used on various models of rotary cutting apparatus without substantial modification of the cutting attachment or the rotary cutting apparatus and wherein the cutting blades are movable along a bearing surface of the pins to effect cooling of the bearing surface and thereby enhance the useful life of the cutting blades without interfering with the cutting efficiency of the cutting blades.

Another object of the present invention, while achieving each of the before-stated objects, is to provide an improved cutting attachment which is economical to manufacture and which can be readily attached to and removed from a rotary cutting apparatus without the need of hand tools.

Yet another object of the present invention, while achieving each of the before-stated objects, is to provide an improved cutting attachment wherein the cutting blades can readily be replaced by the user at the location of use without the need of special tools or fear of improper installation.

Other objects, advantages and features of the present invention will become apparent to those skilled in the art from a reading of the following detailed description and appended claims.

BRIEF DESCRIPTION OF THE DRAWINGS

FIG. 1 is a pictorial representation of a rotary cutting apparatus having a cutting attachment of the present invention connected thereto.

FIG. 2 is a perspective view of a lower side of the cutting attachment of the present invention connected to a threaded spindle or arbor of a rotary cutting apparatus.

FIG. 3 is a top plan view of the cutting attachment of the present invention.

DETAILED DESCRIPTION

Figure 4:
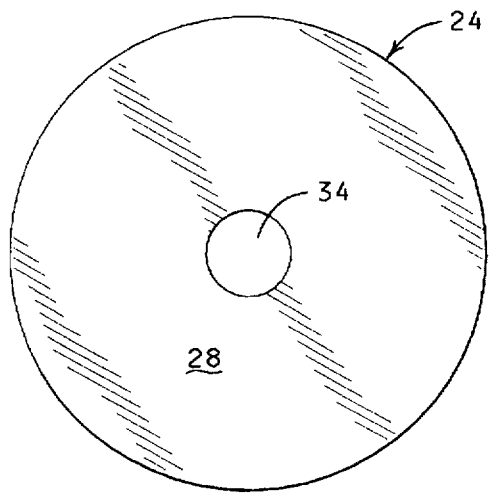
FIG. 4 is a plan view of a first side of a first body member of a rigid body of the cutting attachment of the present invention.

Referring now to the drawings, and more particularly to FIG. 1, a rotary cutting apparatus 10 is illustrated having a cutting attachment 12 of the present invention mounted thereon. The rotary cutting apparatus 10 is provided with a motor 14 and a frame shaft tube 16. The frame shaft tube 16 extends forward and downward from the motor 14, through a bend, to a generally lower vertical end 18 on which the cutting attachment 12 is mounted. The cutting attachment 12 is connected to a drive shaft (not shown) housed within the frame shaft tube 16 via a threaded arbor or spindle 20 (FIG. 2) of the drive shaft of the rotary cutting apparatus 10. If desired, the rotary cutting apparatus 10 can also be provided with a debris shield (not shown) which extends about a portion of the cutting attachment 12.

Rotary cutting apparatus, such as the rotary cutting apparatus 10, are well known in the art and are commercially available. Thus, no further description of the rotary cutting apparatus 10 or its operation is believed necessary to enable one skilled in the art to understand the cutting attachment 12 of the present invention.

Figure 5:
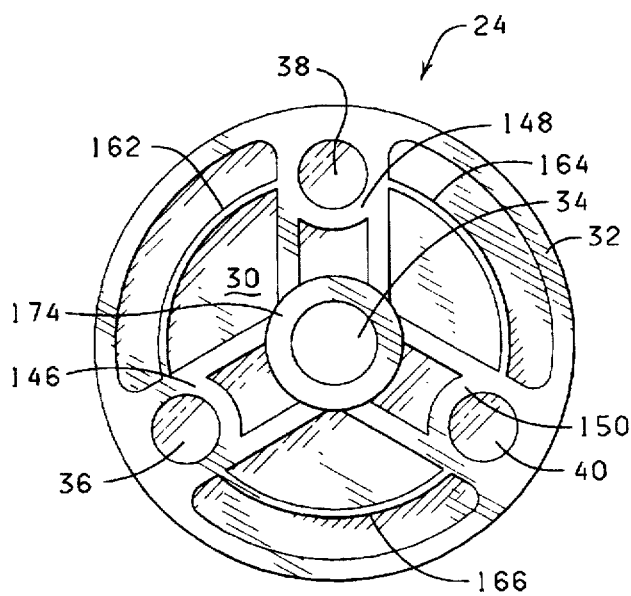
FIG. 5 is a plan view of a second side of the first body member of the rigid body of the cutting attachment of the present invention.
Figure 6:
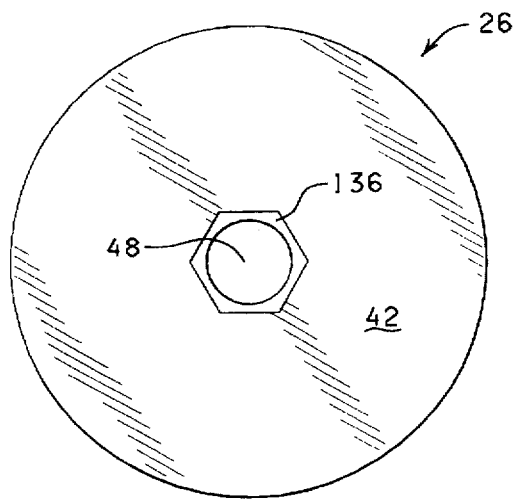
FIG. 6 is a plan view of a first side of a second body member of the rigid body of the cutting attachment of the present invention.

Referring more specifically to FIGS. 2–9, the cutting attachment 12 of the present invention is provided with a rigid body 22 formed from a first body member 24 and a spatially disposed second body member 26. The first body member 24 is provided with a substantially planar first side 28, a second side 30 and a generally vertical sidewall 32. A centrally disposed opening 34 is formed in the first body member 24 so as to extend between the substantially planar first side 28 and the second side 30 of the first body member 24. The second side 30 of the first body member 24 is provided with a plurality of pin receiving holes 36, 38 and 40 formed therein which are spaced an equi-distance apart and disposed in close proximity to an outer peripheral surface of the second side 30 of the first body member 24 substantially as shown in FIG. 5.

The second body member 26, which is substantially a mirror image of the first body member 24 with the exception noted herein, is provided with a substantially planar first side 42, a second side 44 and a generally vertical sidewall 46. A centrally disposed opening 48 extends between the first side 42 and the second side 44 of the second body member 26 such that, in a connected position of the first and second body members 24 and 26 as will be described in detail hereinafter, the centrally disposed opening 48 in the second body member 26 is axially aligned with the centrally disposed opening 34 in the first body member 24. The second side 44 of the second body member 26 is provided with a plurality of pin receiving holes 50, 52 and 54 spaced an equi-distance apart and disposed in close proximity to an outer peripheral surface of the second side 44 of the second body member 26 such that, in an assembled position, each of the pin receiving holes 50, 52 and 54 in the second side 44 of the second body member 26 are alignable with one of the pin receiving holes 36, 38 and 40 in the second side 30 of the first body member 24.

The cutting attachment 12 further includes a plurality of pins 56, 58 and 60 for rotatably connecting a plurality of radially extending cutting members 62, 64 and 66 to the rigid body 22 and for connecting the first and second body members 24 and 26 to form the rigid body 22 whereby at least a portion of the first and second body members 24 and 26 are spatially disposed a distance (x) so that the cutting members 62, 64 and 66 are rotatable about and axially move along the pins 56, 58 and 60 throughout the distance (x) provided between the first and second body members 24 and 26 in a manner to be more fully described hereinafter.

The pin 56 is an elongated, cylindrical-shaped member having a first end 70, a medial portion 72 defining a bearing surface, and a second end 74; the pin 58 is an elongated, cylindrical-shaped member having a first end 76, a medial portion 78 defining a bearing surface, and a second end 80; and the pin 60 is an elongated, cylindrical-shaped member having a first end 82, a medial portion 84 defining a bearing surface, and a second end 86. Thus, upon disposing the first end 70 of the pin 56 in the pin receiving hole 36 in the second side 30 of the first body member 24 and disposing the second end 74 of the pin 56 in the pin receiving hole 50 in the second side 44 of the second body member 26, the first end 76 of the pin 58 in the pin receiving hole 38 in the second side 30 of the first body member 24 and the second end 80 of the pin 58 in the pin receiving hole 52 in the second side 44 of the second body member 26 and the first end 82 of the pin 60 in the pin receiving hole 40 formed in the second side 30 of the first body member 24 and the second end 86 of the pin 60 in the pin receiving hole 54 formed in the second side 44 of the second body member 26, the pins 56, 58 and 60 cooperate to secure the first body member 24 to the second body member 26 to form the rigid body 22 while maintaining at least a portion of the first body member 24 in a spatial relationship with the second body member 26 so that at least a portion of the first body member 24 is disposed the predetermined distance (x) from the second body member 26.

Each of the pins 56, 58 and 60 have a pin length (pl) and a pin diameter (pd). The pin length (pl) of the pins 56, 58 and 60 is such that, in a connected position, the bearing surfaces defined by the medial portions 72, 78 and 84 of the pins 56, 58 and 60 are each exposed in the space formed between the first and second body members 24 and 26 of the rigid body 22 substantially as shown in FIGS. 9 and 10.

Figure 9:
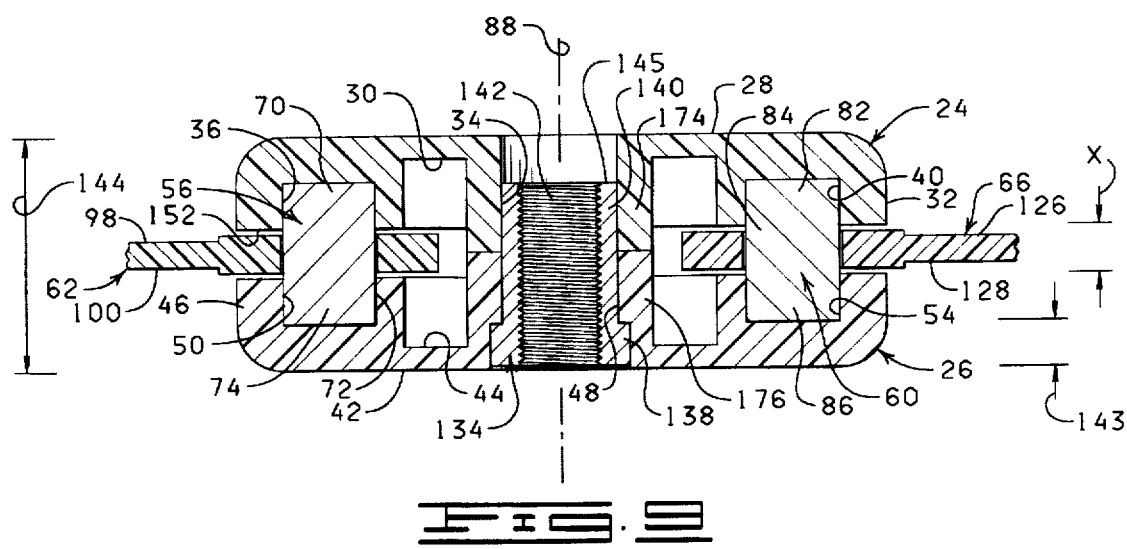
FIG. 9 is a cross-sectional view of the cutting attachment of FIG. 3 taken along lines 9—9.
Figure 10:
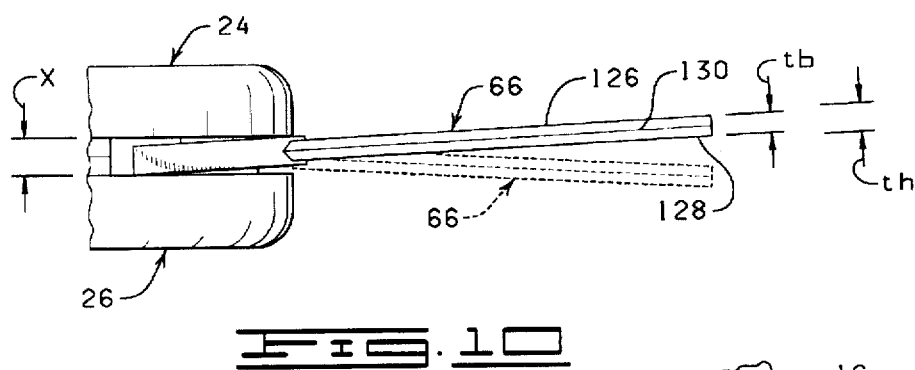
FIG. 10 is a partially broken, side elevational view of the cutting attachment of the present invention depicting vertical movement of a cutting member along a bearing surface of a pin.

Each of the cutting members 62, 64 and 66 are connected to one of the pins 56, 58 and 60 for cutting vegetation as the rigid body 22 of the cutting attachment 12 rotates about axis 88 (FIG. 9). The cutting members 62, 64 and 66 are formed of a high-impact plastic or similar composition and each of the cutting members 62, 64 and 66 are movable between outwardly cutting positions (FIGS. 1–3) and a deflected, out of the way position when one of the cutting members, such as cutting member 62 strikes an object, such as a rock 90 (FIG. 11), during rotation of the cutting attachment 12 so that the cutting members 62, 64 and 66 will not be damaged.

The cutting member 62 is provided with a blade portion 92 and a head portion 94 having an aperture 96 through which the pin 56 extends for connecting the cutting member 62 to the pin 56 and thus to the first and second body members 24 and 26 of the rigid body 22. The blade portion 92 of the cutting member 62 is provided with first and second spaced-apart generally planar surfaces 98 and 100 (FIG. 9) and cutting edges 102 and 104 (FIG. 3) which have a substantially V-shaped configuration with approximately equivalent inclination angles.

The cutting member 64 is also provided with a blade portion 106 and a head portion 108 having an aperture 110 through which the pin 58 extends for connecting the cutting member 64 to the pin 58 and thus to the first and second body members 24 and 26 of the rigid body 22. The blade portion 106 of the cutting member 64 is provided with first and second spaced-apart generally planar surfaces 112 and 114 and cutting edges 116 and 118 (FIG. 3) which have a substantially V-shaped configuration with approximately equivalent inclination angles.

The cutting member 66 is provided with a blade portion 120 and a head portion 122 having an aperture 124 through which the pin 60 extends for connecting the cutting member 66 to the pin 60 and thus to the first and second body members 24 and 26 of the rigid body 22. The blade portion 120 of the cutting member 66 is provided with first and second spaced-apart generally planar surfaces 126 and 128 and cutting edges 130 and 132 (FIG. 3) which have a substantially V-shaped configuration with approximately equivalent inclination angles.

The cutting members 62, 64 and 66 are substantially identical in construction and each has a thickness less than the distance (x) between the first and second body members 24 and 26 so that the cutting members 62, 64 and 66 are freely rotatable upon the bearing surface of the pins 56, 58 and 60 while at the same time being permitted to move axially along the bearing surface throughout the distance (x) between the first and second body members 24 and 26. That is, the blade portions 92, 106 and 120 of the cutting members 62, 64 and 66 each has a thickness (tb) and the head portions 108 and 122 of the cutting members 62, 64 and 66 each have a thickness (th) wherein the thickness (th) is greater than the thickness (tb), but each of the thickness (th) and (tb) are less than the distance (x) between the first and second body members 24 and 26. In addition, each of the apertures 96, 110 and 124 formed in the head portions 94, 108 and 122 of the cutting members 62, 64 and 66 each have a diameter (ad) greater than the diameter (pd) of the pins 56, 58 and 60 so that upon positioning the pins 56, 58 and 60 through the apertures 96, 110 and 124 in the head portions 94, 108 and 122 of the cutting members 62, 64 and 66, the cutting members 62, 64 and 66 are permitted to rotate about and axially move along the bearing surface of the pins 62, 64 and 66 during operation of the rotary cutting apparatus 10 and thereby effect cooling of the bearing surface of the pins 62, 64 and 66 and thus substantially reduce enlargement of the apertures 96, 110 and 124 in the head portions 94,108 and 122 of the cutting members 62, 64 and 66. Further, because of the configuration of the cutting members 62, 64 and 66 and depending upon the direction of rotation of the cutting attachment 12, either of the cutting edges, such as the cutting edges 102 and 104, of the cutting member 62 can be employed as the leading or trailing edge and such can be reversed by merely disassembling the rigid body 22 and turning the cutting member, such as the cutting member 62, upside down after the cutting attachment 12 has been removed from the rotary cutting apparatus 10.

The rigid body 22 having the cutting members 62, 64 and 66 connected thereto via the pins 56, 58 and 60, can be connected to the threaded arbor or spindle 20 of the rotary cutting apparatus 10 (FIG. 2) via connector 134 of the cutting attachment 12. As previously stated, the first and second body members 24 and 26 are substantially identical in construction with the exception that the planar first side 42 of the second connector member 26 is provided with a non-circular recess 136 which extends about the centrally disposed opening 48 in the second body member 26. As will be more fully described hereinafter, the non-circular recess 136 formed in the planar first side 42 of the second body member 26 is configured to receive a portion of the connector 134 to facilitate connection of the rigid body 22 formed from the first and second body members 24 and 26 to the threaded arbor or spindle 20 of the rotary cutting apparatus 10 by hand and without the use of tools.

Figure 8:
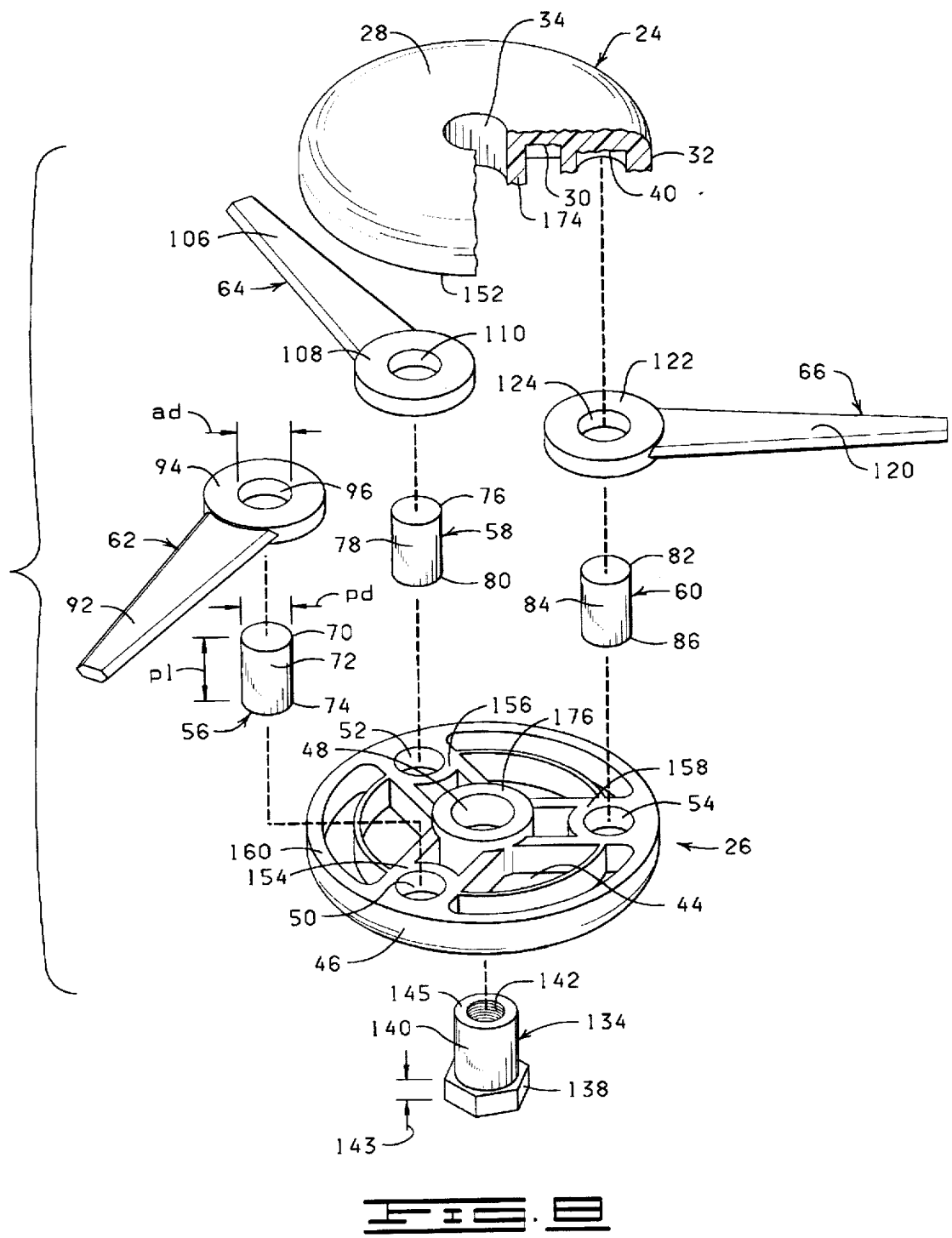
FIG. 8 is a perspective, partially broken, exploded view of the cutting attachment of the present invention.

As more clearly shown in FIGS. 8 and 9, the connector 134 is provided with a non-circular head portion 138 and a shaft or barrel portion 140 which extends substantially normal to the non-circular head portion 138. Internally disposed threads 142 extend through the non-circular head portion 138 and the shaft portion 140 substantially as shown. The non-circular head portion 138, which is provided with a configuration substantially corresponding to the configuration of the non-circular recess 136 formed about the centrally disposed opening 48 in the first side 42 of the second body member 26, has a height 143 substantially corresponding to the depth of the non-circular recess 136 so that when the connector 134 is disposed within the aligned centrally disposed openings 34 and 48 of the first and second body members 24 and 26, the non-circular head portion 138 of the connector 134 is substantially coplanar with the planar first side 42 of the second body member 26. Further, the connector 134 is provided with a length 144 such that when the connector 134 is disposed within the centrally disposed openings 34 and 48 of the first and second body members, a distal end 145 of the shaft 140 is substantially coplanar with the first ends 70, 76 and 82 of the pins 56, 58 and 60.

The diameter and pitch of the internally disposed threads 142 extending through the non-circular head portion 138 and the shaft portion 140 of the connector 134 can vary and will be dependent upon the diameter and pitch of the threaded arbor or spindle 20 of the rotary cutting apparatus 10 to which the cutting attachment 12 is to be connected. Thus, to provide the desired versatility to the cutting attachment 12 so that the cutting attachment 12 can be attached to a variety of different commercially available rotary cutting apparatus 10, the only modification to the attachment 12 required to provide such versatility is to provide the connector 138 with an internal diameter and threads of the desired pitch to correspond to the threaded arbor or shaft 20 of the rotary cutting apparatus 10.

To enhance the rigidity of the rigid body 22 of the rotary cutting attachment 12, as well as to enhance the cutting attachment 12 by providing a self-cleaning feature, the first body member 24 is provided with a plurality of radially extending bosses 146,148 and 150 which extend from the centrally disposed opening 34 in the first body member 24 to the sidewall 32 of the first body member 24. The bosses 146, 148 and 150 of the first body member 24 each contain one of the pin receiving holes 36, 38 and 40 of the first body member 24 substantially as shown in FIG. 5. Further, in order to prevent undesired restriction of the rotation of the cutting members 62, 64 and 66 during rotation of the cutting attachment 12, the bosses 146, 148 and 150 are substantially coplanar with an edge 152 (FIG. 8) of the sidewall 32 of the first body member 24.

Figure 7:
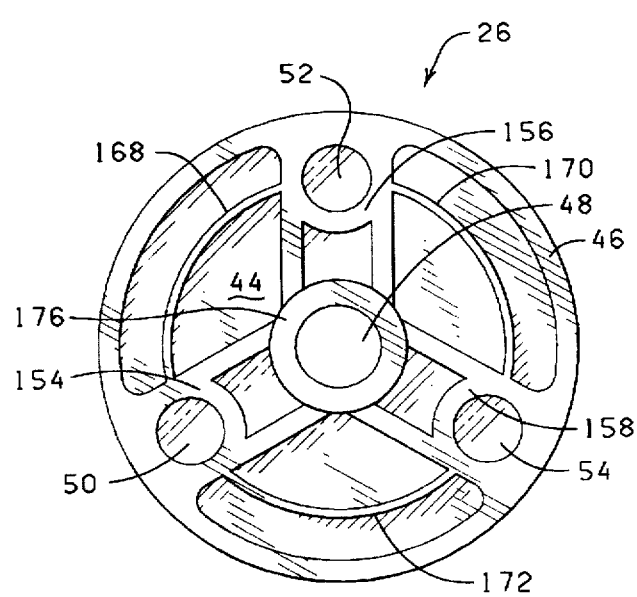
FIG. 7 is a plan view of a second side of the second body member of the rigid body of the cutting attachment of the present invention.

Similarly, the second body member 26 is provided with a plurality of radially extending bosses 154, 156, and 158 which extend from the centrally disposed opening 48 in the second body member 26 to the sidewall 46 of the second body member 26. The bosses 154, 156 and 158 each contain one of the pin receiving holes 50, 52 and 54 of the second body member 26 substantially as shown in FIGS. 7 and 8. Further, in order to prevent undesirable restriction of the rotation of the cutting members 62, 64 and 66 during rotation of the cutting attachment 12, the bosses 154, 156 and 158 are substantially coplanar with an edge 160 (FIG. 8) of the sidewall 46 of the second body member 26.

To prevent improper assembly of the first and second body members 24 and 26 by insuring that the pins 56, 58 and 60 are disposed in their respective pin receiving holes, namely, pin receiving holes 36 and 50, 38 and 52, and 40 and 54 during assembly of the cutting attachment 12, the first body member 24 is provided with a plurality of pin guiding bosses 162, 164 and 166 which extend between the bosses 146, 148 and 150 substantially as shown in FIG. 5; and the second body member is provided with a plurality of pin guiding bosses 168, 170 and 172 which extend between the bosses 154, 156 and 158 substantially as shown in FIG. 7. That is, the pin guiding boss 162 of the first body member 24 is an arcuate segment extending between the boss 146 and the boss 148 so as to be disposed along a radius a distance from the center of the centrally disposed opening 34 in the first body member 24 and the pin receiving holes 36 and 38 formed in the bosses 146 and 148; the pin guiding boss 164 is an arcuate segment extending between the boss 148 and the boss 150 so as to be disposed along a radius a distance from the center of the centrally disposed opening 34 in the first body member 24 and the pin receiving holes 38 and 40 formed in the bosses 148 and 150; and the pin guiding boss 166 is an arcuate segment extending between the boss 150 and the boss 146 so as to be disposed along a radius a distance from the center of the centrally disposed opening 34 in the first body member 24 and the pin receiving holes 40 and 36 formed in the bosses 150 and 146.

Similarly, the pin guiding boss 168 of the second body member 26 is an arcuate segment extending between the boss 154 and the boss 156 so as to be disposed along a radius a distance from the center of the centrally disposed opening 48 in the second body member 26 and the pin receiving holes 50 and 52 formed in the bosses 154 and 156; the pin guiding boss 170 is an arcuate segment extending between the boss 156 and the boss 158 so as to be disposed along a radius a distance from the center of the centrally disposed opening 48 in the second body member 26 and the pin receiving holes 52 and 54 formed in the bosses 156 and 158; and the pin guiding boss 172 is an arcuate segment extending between the boss 158 and the boss 154 so as to be disposed along a radius a distance from the center of the centrally disposed opening 48 in the second body member 26 and the pin receiving holes 54 and 50 formed in the bosses 158 and 154.

To enhance rigidity of the rigid body 22, especially when the cutting attachment 12 is connected to the threaded arbor or spindle 20 of the rotary cutting apparatus 10, the second side 30 of the first body member 24 is provided with a first support boss 174 which extends about the centrally disposed opening 34 of the first body member 24; and the second side 44 of the second body member 26 is provided with a second support boss 176 which extends about the centrally disposed opening 48 of the second body member 26. The first support boss 174 extends outwardly from the first body member 24 a distance approximately equal to one half (½) of the distance x between the first and second body members 24 and 26. Similarly, the second support boss 176 extends outwardly from the second body member 26 a distance approximately equal to one half (½) of the distance x between the first and second body members 24 and 26. Thus, in an assembled position of the first and second body members 24 and 26, the first support boss 174 is aligned with and disposed substantially adjacent the second support boss 176 such that the first and second support bosses 174 and 176 cooperate to support the portion of the first and second body members 24 and 26 extending about the centrally disposed openings 34 and 48 in the first and second body members 24 and 26, respectively. The first and second bosses 174 and 176, in cooperation with the pins 56, 58 and 60, maintain the first and second body members 24 and 26 in the desired spatial relation so that the cutting members 62, 64 and 66 are freely rotatable upon the bearing surface of the pins 56, 58 and 60 while at the same time being movable axially along the bearing surface of the pins 56, 58 and 60 throughout the distance (x) between the first and second body members 24 and 26.

Figure 11:
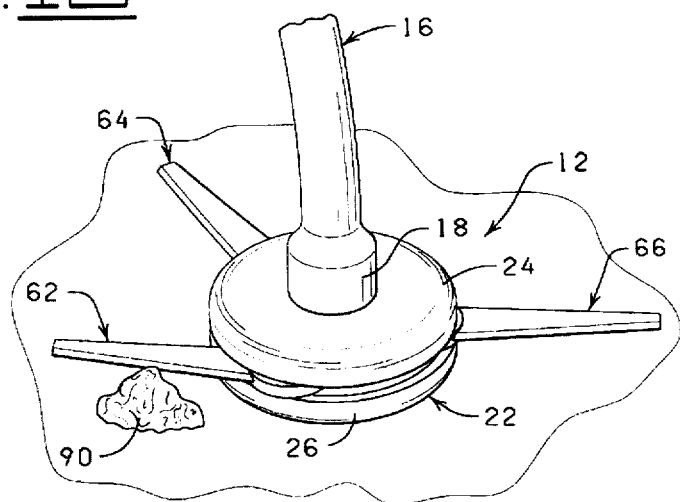
FIG. 11 is a perspective view of the cutting attachment of the present invention attached to a rotary cutting apparatus wherein one of the cutting members has been displaced temporarily due to the cutting member encountering an object during operation of the rotary cutting apparatus.

In operation and use, the cutting attachment 12 is connected to the threaded arbor or spindle 20 of the rotary cutting apparatus 10 by threading the connector 134 which is sized and dimensioned to have the proper internal diameter and thread pitch to matingly engage with the threaded arbor or spindle 20. The cutting attachment 12 can then be operated in close proximity to the ground in the area in which vegetation is to be cut. The cutting members 62, 64 and 66 will be rotated as the cutting attachment 12 is rotated and, in the event a hard object is struck, such as by cutting member 62, the cutting member 62 will either be deflected upwardly as it moves axially along the bearing surface of the connector pin 70 if the member 62 can ride over the object or, if the object is too large, the cutting member 62 will be deflected out of the way as shown in FIG. 11. As soon as the object has been cleared, the cutting member 62 will return to its normal position by centrifugal force.

It should be noted that the configuration and smooth planar first side 42 of the second body member 26, in combination with the sidewalls 32 and 44 of the first and second body members 24 and 26 prevent the rigid body member from engaging or snagging objects encountered by the cutting attachment 12. As a result, the configuration of the first and second body members 24 and 26 enable the cutting attachment 12 to skid over objects encountered by it while permitting the cutting members 62, 64 and 66 to rotate about and move axially along the bearing surface of the pins 56, 58 and 60 and thereby effect cooling of the bearing surface of the pins 56, 58 and 60. The rotational and axial movement of the cutting members 62, 64 and 66 along the bearing surface of the pins 56, 58 and 60 substantially enhance the life of the cutting members 62, 64 and 66 by reducing heat and friction between the pins 56, 58 and 60 and the cutting members 62, 64 and 66 due to movement of the cutting members 62, 64 and 66 about and along the bearing surface of the pins 56, 58 and 60.

Further the interconnection of the first and second body members 24 and 26 to form the rigid body 22 of the cutting attachment 12 provides a self-cleaning effect so as to prevent cuttings and debris from depositing within the space formed between the first and second body members 24 and 26 and thereby interfere with the effective operation of the rotary cutting apparatus 10.

Changes may be made in the construction and the operation of the various parts, elements and assemblies described herein and the steps or the sequence of steps of the methods described herein without departing from the spirit and the scope of the invention as defined in the following claims.

What is claimed:

1. A cutting attachment for a rotary cutting apparatus comprising:
   a rigid body comprising a first body member and a spatially disposed second body member, the first body member having a first side, a second side, and a centrally disposed opening extending therethrough, the second side of the first body member having a plurality of pin receiving holes formed therein an equi-distance apart, the second body member having a first side, a second side, and a centrally disposed opening extending therethrough, the second side of the second body member having a plurality of pin receiving holes formed therein an equi-distance apart such that each of the pin receiving holes in the second side of the second body member is alignable with one of the pin receiving holes in the second side of the first body member;
   a plurality of pins for connecting the first and second body members and for maintaining at least a peripheral portion of the first and second body members in a spatially disposed relationship, each pin having a first end, a medial portion defining a bearing surface and a second end, each of the pins having a pin length (pl) and a diameter (pd) such that upon disposing the first end of each of the pins in one of the pin receiving holes in the second side of the first body member and disposing the second end of such pins in one of the pin receiving holes in the second side of the second body member the first and second body members are spatially disposed a predetermined distance (x) apart whereby the bearing surface of each of the pins is exposed in the space provided between the first and second body members of the rigid body;
   a plurality of cutting members, each cutting member comprising a blade portion and a head portion having an aperture extending therethrough such that one of the pins is disposed through the aperture in the head portion of each of the cutting members for rotatably connecting one of the cutting members to each of the pin members and to the rigid body, the blade portion of each of the cutting members having a thickness (tb) less than the distance (x) between the first and second body member and the head portion of each of the cutting members having a thickness (th) less than the distance (x) between the first and second body member, the aperture in the head portion having a diameter (ad) greater than the diameter (pd) of the pin whereby each of the cutting members is permitted to rotate about and axially move along the bearing surface of the pin to which the cutting member is connected during operation of the rotary cutting device to effect cooling of the bearing surface of the pins and thereby substantially reduce enlargement of the apertures in the head portions of the cutting members due to rotational movement of the head portions of the cutting members about the bearing surfaces of the pins and axial movement of the head portions of the cutting members along the bearing surfaces of the pins;
   pin guiding boss means disposed on the second side of the first and second body members for enhancing alignment of the pins with the pin receiving holes in the first and second body members and thereby insuring proper connection of the first and second body members via the pins; and
   means for attaching the rigid body of the cutting attachment to the rotary cutting device.

2. A cutting attachment for a rotary cutting apparatus having a threaded arbor comprising:
   a rigid body comprising a first body member and a spatially disposed second body member, the first body member having a first side, a second side, and a centrally disposed opening extending therethrough, the second side of the first body member having a plurality of pin receiving holes formed therein an equi-distance apart, the second body member having a first side, a second side, and a centrally disposed opening extending therethrough, the second side of the second body member having a non-circular recess extending about the centrally disposed opening and a plurality of pin receiving holes formed therein an equi-distance apart such that each of the pin receiving holes in the second side of the second body member is alignable with one of the pin receiving holes in the second side of the first body member;
   a plurality of pins for connecting the first and second body members and for maintaining at least a peripheral portion of the first and second body members in a spatially disposed relationship, each pin having a first end, a medial portion defining a bearing surface and a second end, each of the pins having a pin length (pl) and a diameter (pd) such that upon disposing the first end of each of the pins in one of the pin receiving holes in the second side of the first body member and disposing the second end of such pins in one of the pin receiving holes in the second side of the second body member the first and second body members are spatially disposed a predetermined distance (x) apart whereby the bearing surface of each of the pins is exposed in the space provided between the first and second body members of the rigid body;
   a plurality of cutting members, each cutting member comprising a blade portion and a head portion having an aperture extending therethrough such that one of the pins is disposed through the aperture in the head portion of each of the cutting members for rotatably connecting one of the cutting members to each of the pin members and to the rigid body, the blade portion of each of the cutting members having a thickness (tb) less than the distance (x) between the first and second body member and the head portion of each of the cutting members having a thickness (th) less than the distance (x) between the first and second body member, the aperture in the head portion having a diameter (ad) greater than the diameter (pd) of the pin whereby each of the cutting members is permitted to rotate about and axially move along the bearing surface of the pin to which the cutting member is connected during operation of the rotary cutting device to effect cooling of the bearing surface of the pins and thereby substantially reduce enlargement of the apertures in the head portions of the cutting members due to rotational movement of the head portions of the cutting members about the bearing surfaces of the pins and axial movement of the head portions of the cutting members along the bearing surfaces of the pins; and
   means for attaching the rigid body of the cutting attachment to the rotary cutting device comprising:
      a connector having a non-circular head portion and a shaft portion having a distal end, the connector having an internally threaded bore adapted to threadably receive the threaded arbor of the rotary cutting apparatus, the non-circular head portion substantially conforming to the configuration of the non-circular recess in the second body member and adapted to be disposed within the non-circular recess of the second body member, the shaft portion of the connector disposed within the centrally disposed opening in the first and second body members, the connector having a length such that, in an assembled position, the distal end of the shaft portion is substantially coplanar with the first end of the pins connected to the first body member.

3. A cutting attachment for a rotary cutting apparatus having a threaded arbor comprising:

a rigid body comprising a first body member having a centrally disposed opening extending therethrough and a spatially disposed second body member having a centrally disposed opening extending therethrough and a non-circular recess formed about the centrally disposed opening;

a plurality of means for connecting the first body member to the second body member such that at least a peripheral portion of the first body member is disposed a distance from a peripheral portion of the second body member, each of the means for connecting the first body member to the second body member defining a bearing surface extending at least the distance (x) between the first and second body members, the portion of the means for connecting the first body member to the second body member which defines the bearing surfaces of the means having a diameter (pd);

a plurality of cutting members, each cutting member having an aperture extending therethrough in one end thereof such that one of the means for connecting the first and second body members is disposed through the aperture in each of the cutting members for rotatably connecting one of the cutting members to each of the means for connecting the first and second body members to provide the rigid body, each of the cutting blade members having a thickness (t) less than the distance (x) between the first and second body member, the aperture in the cutting member having a diameter (ad) greater than the diameter (pd) of the means for connecting the first and second body members whereby each of the cutting members is permitted to rotate about and axially move along the bearing surface of the means for connecting the first and second body members to which the cutting member is connected during operation of the rotary cutting device to effect cooling of the bearing surface of the means for connecting the first and second body members and thereby substantially reduce enlargement of the apertures in the cutting members due to rotational movement of the head portions of the cutting members about the bearing surfaces of the means for connecting the first and second body members and axial movement of the cutting members along the bearing surfaces of the means for connecting the first and second body members during operation of the rotary cutting apparatus; and means for attaching the rigid body of the cutting attachment to the threaded arbor of the rotary cutting apparatus comprising:

a connector having a non-circular head portion and a shaft portion having a distal end, the connector having an internally threaded bore adapted to threadably receive the threaded arbor of the rotary cutting apparatus, the non-circular head portion substantially conforming to the configuration of the non-circular recess in the second body member and adapted to be disposed within the non-circular recess of the second body member, the shaft portion of the connector disposed within the centrally disposed opening in the first and second body members, the connector having a length such that, in an assembled position, the distal end of the shaft portion is substantially coplanar with the first end of the pins connected to the first body member.

4. A cutting attachment for a rotary cutting apparatus comprising:

a rigid body comprising a first body member having a centrally disposed opening extending therethrough and a spatially disposed second body member having a centrally disposed opening extending therethrough;

a plurality of means for connecting the first body member to the second body member such that at least a peripheral portion of the first body member is disposed a distance from a peripheral portion of the second body member, each of the means for connecting the first body member to the second body member defining a bearing surface extending at least the distance (x) between the first and second body members, the portion of the means for connecting the first body member to the second body member which defines the bearing surfaces of the means having a diameter (pd);

a plurality of cutting members, each cutting member having an aperture extending therethrough in one end thereof such that one of the means for connecting the first and second body members is disposed through the aperture in each of the cutting members for rotatably connecting one of the cutting members to each of the means for connecting the first and second body members to provide the rigid body, each of the cutting blade members having a thickness (t) less than the distance (x) between the first and second body member, the aperture in the cutting member having a diameter (ad) greater than the diameter (pd) of the means for connecting the first and second body members whereby each of the cutting members is permitted to rotate about and axially move along the bearing surface of the means for connecting the first and second body members to which the cutting member is connected during operation of the rotary cutting device to effect cooling of the bearing surface of the means for connecting the first and second body members and thereby substantially reduce enlargement of the apertures in the cutting members due to rotational movement of the head portions of the cutting members about the bearing surfaces of the means for connecting the first and second body members and axial movement of the cutting members along the bearing surfaces of the means for connecting the first and second body members during operation of the rotary cutting apparatus;

guiding boss means disposed on the first and second body members for enhancing alignment of the means for connecting the first body member to the second body member and thereby insuring proper connection of the first and second body members via the means for connecting the first and second body members; and means for attaching the rigid body of the cutting attachment to the rotary cutting apparatus.

5. The cutting attachment for a rotary cutting apparatus of claim 1 wherein the pin guiding boss means comprises a plurality of arcuate segments, one of each of the arcuate segments extending between each of the pin receiving holes of the first and second body members along a radius a distance from the center of the centrally disposed opening in the first and second body members.

6. The cutting attachment for a rotary cutting apparatus of claim 1 further comprising a plurality of radially extending bosses disposed along the second side of the first and second body members to reinforce and enhance the rigid body formed of the first and second body members, each of the radially extending bosses containing one of the pin receiving holes.

7. The cutting attachment for a rotary cutting apparatus of claim 1 further comprising:
   a first support boss formed on the second side of the first body member so as to extend about the centrally disposed opening in the first body member; and
   a second support boss formed on the second side of the second body member so as to extend about the centrally disposed opening in the second body member, the first support boss extending outwardly from the first body member a distance of approximately one-half the distance x between the first and second body members, the second support boss extending outwardly from the second body member a distance of approximately one-half the distance x such that in an assembled position the first and second support bosses are substantially adjacently disposed and cooperate with the pins to maintain the first and second body members in the desired spatial relation to permit the cutting members to rotate about and axially move along the bearing surfaces defined by the pins.

8. The cutting attachment for a rotary cutting apparatus of claim 2 further comprising:
   a first support boss formed on the second side of the first body member so as to extend about the centrally disposed opening in the first body member; and
   a second support boss formed on the second side of the second body member so as to extend about the centrally disposed opening in the second body member, the first support boss extending outwardly from the first body member a distance of approximately one-half the distance x between the first and second body members, the second support boss extending outwardly from the second body member a distance of approximately one-half the distance x such that in an assembled position the first and second support bosses are substantially adjacently disposed and cooperate with the pins to maintain the first and second body members in the desired spatial relation to permit the cutting members to rotate about and axially move along the bearing surfaces defined by the pins.

9. The cutting attachment for a rotary cutting apparatus of claim 3 further comprising:
   guiding boss means disposed on the first and second body members for enhancing alignment of the means for connecting the first body member to the second body member and thereby insuring proper connection of the first and second body members.

10. The cutting attachment for a rotary cutting apparatus of claim 3 further comprising:
    pin guiding boss means disposed on the second side of the first and second body members for enhancing alignment of the pins with the pin receiving holes in the first and second body members and thereby insuring proper connection of the first and second body members via the pins.

* * * * *